United States Patent
Edson et al.

(10) Patent No.: US 7,487,856 B2
(45) Date of Patent: Feb. 10, 2009

(54) ELECTRICALLY ACTUATED, HYDRAULIC POWER STEERING SYSTEM

(75) Inventors: Joey D. Edson, Seymour, MO (US); Randy C Foster, Strafford, MO (US); Richard J. Meckstroth, Vonore, TN (US); Billy L. Speer, Springfield, MO (US)

(73) Assignee: Fluid Routing Solutions, Inc., Rochester Hills, MI (US)

( * ) Notice: Subject to any disclaimer, the term of this patent is extended or adjusted under 35 U.S.C. 154(b) by 226 days.

(21) Appl. No.: 11/513,382

(22) Filed: Aug. 30, 2006

(65) Prior Publication Data

US 2008/0066989 A1 Mar. 20, 2008

(51) Int. Cl.
*B62D 5/06* (2006.01)

(52) U.S. Cl. ............... 180/421; 180/411; 180/442; 180/417

(58) Field of Classification Search ............ 180/441, 180/471, 421, 442
See application file for complete search history.

(56) References Cited

U.S. PATENT DOCUMENTS

| | | | |
|---|---|---|---|
| 2,987,293 A | 6/1961 | Knudson | |
| 3,935,917 A | 2/1976 | Eley et al. | |
| 4,217,968 A | 8/1980 | Dezelan | |
| 4,400,938 A | 8/1983 | Ohe | |
| 4,409,789 A | 10/1983 | Hansen et al. | |
| 4,422,290 A | 12/1983 | Huffman | |
| 4,643,227 A | 2/1987 | Suzuki | |
| 4,739,693 A | 4/1988 | Honaga et al. | |
| 4,809,586 A | 3/1989 | Gage | |
| 4,898,078 A | 2/1990 | Gage | |
| 4,942,935 A | 7/1990 | Lech | |
| 5,279,380 A | 1/1994 | Frank et al. | |
| 5,289,894 A | 3/1994 | Yoshiyuki | |
| 5,307,892 A | 5/1994 | Phillips | |
| 5,372,214 A | 12/1994 | Haga et al. | |
| 5,377,717 A | 1/1995 | Toogood et al. | |
| 5,392,690 A | 2/1995 | Hundertmark | |
| 5,505,275 A | 4/1996 | Phillips | |
| 5,511,457 A | 4/1996 | Hawkins et al. | |
| 5,553,683 A | 9/1996 | Wenzel | |
| 5,558,177 A | 9/1996 | Inaguma et al. | |
| 5,607,137 A | 3/1997 | Kanda et al. | |
| 5,638,912 A * | 6/1997 | Haga et al. ............ 180/417 |
| 5,682,745 A | 11/1997 | Phillips | |
| 5,749,431 A | 5/1998 | Peterson | |
| 5,862,878 A | 1/1999 | Bohner | |
| 5,921,342 A | 7/1999 | Maruyama | |
| 6,122,912 A | 9/2000 | Phillips | |
| 6,167,334 A | 12/2000 | Liubakka et al. | |
| 6,250,416 B1 | 6/2001 | Pluschke et al. | |

(Continued)

*Primary Examiner*—Paul N Dickson
*Assistant Examiner*—Tashiana Adams
(74) *Attorney, Agent, or Firm*—Joseph V. Tassone; Thompson Hine LLP

(57) ABSTRACT

An electrically actuated, hydraulic power steering system is provided. The steering system includes a hydraulic pump for generating hydraulic pressure, a hydraulic fluid reservoir, a hydraulic cylinder, and a control valve arrangement that selectively connects the hydraulic cylinder to the pump and the hydraulic fluid reservoir. The control valve arrangement is characterized during the on-center position by a first and a second chamber of the hydraulic cylinder being in fluid communication with each other but not with the fluid reservoir. In one embodiment, the steering system has a steering sensor, a control box, and two pressure accumulators for providing at least two levels of steering assist.

30 Claims, 14 Drawing Sheets

U.S. PATENT DOCUMENTS

| | | |
|---|---|---|
| 6,298,941 B1 | 10/2001 | Spadafora |
| 6,415,820 B1 | 7/2002 | Gluf, Jr. |
| 6,488,112 B1 * | 12/2002 | Kleist .......................... 180/403 |
| 6,539,710 B2 | 4/2003 | Draper |
| 7,025,044 B1 * | 4/2006 | Breeden et al. ............. 123/403 |
| 7,364,006 B2 * | 4/2008 | Birsching et al. ........... 180/441 |
| 2004/0226769 A1 | 11/2004 | Croughs |
| 2006/0243518 A1 * | 11/2006 | Kobayashi ................... 180/441 |
| 2007/0028606 A1 * | 2/2007 | Misunou et al. ................ 60/384 |
| 2007/0043490 A1 * | 2/2007 | Yokota et al. .................. 701/41 |
| 2007/0095598 A1 * | 5/2007 | Williams ..................... 180/441 |

* cited by examiner

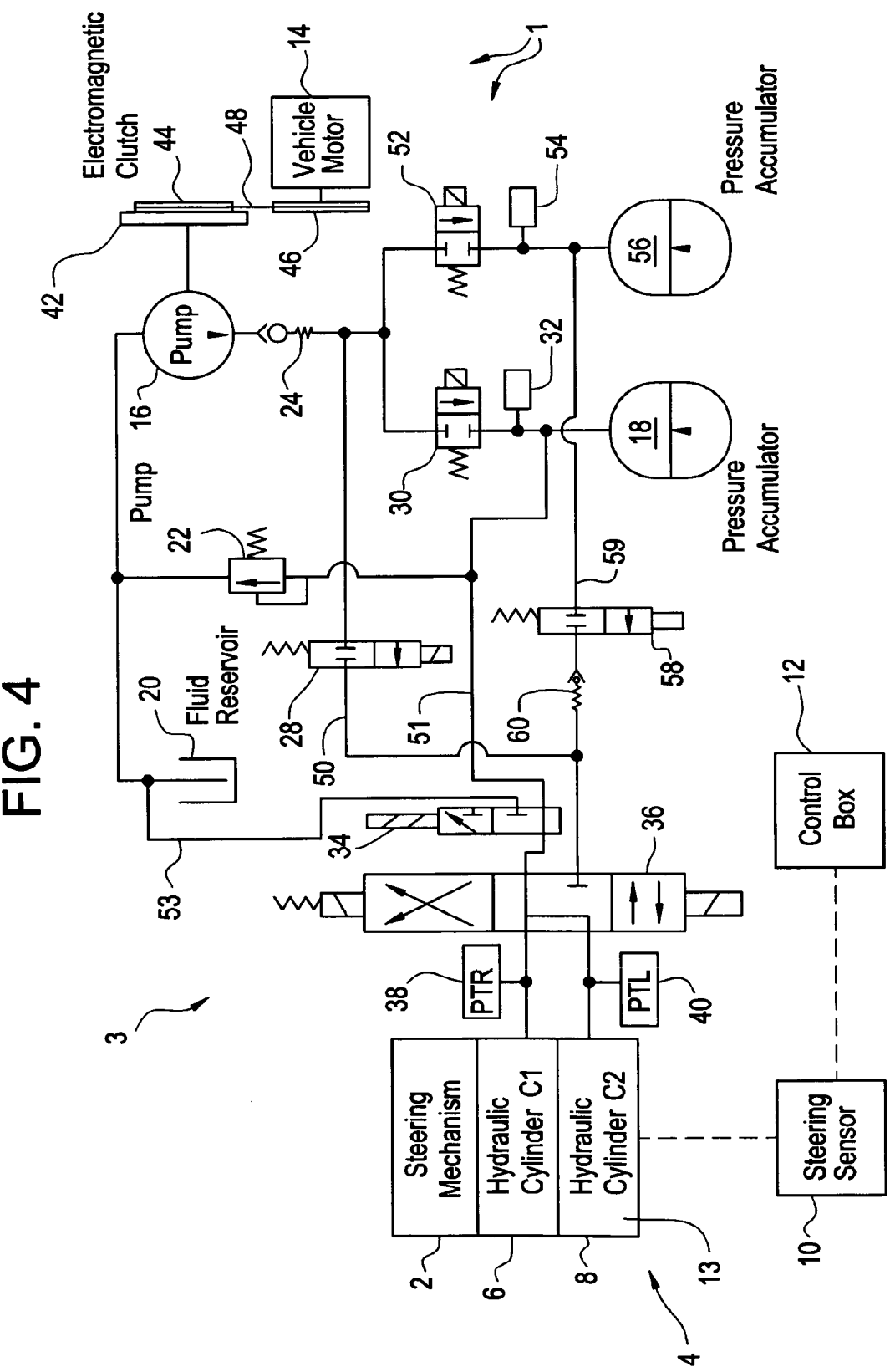

ELECTRICALLY ACTUATED, HYDRAULIC POWER STEERING SYSTEM

TECHNICAL FIELD

The present invention relates generally to power steering systems and, in particular, to electrically actuated, hydraulic power steering systems.

BACKGROUND

Currently almost all automobiles and light trucks have some version of a hydraulically controlled, hydraulic power steering system, which is susceptible to parasitic energy loss. In such hydraulic systems, a hydraulic pump is continuously engaged with the vehicle motor to provide a constant flow of hydraulic fluid, typically at a significantly high pressure, to the power steering system. The operator, however, does not always require power steering assist to steer the vehicle, and so there is a significant energy inefficiency that results in the waste of billions of gallons of gasoline in the world every year. What is needed is an improved, "on demand" power steering system, in which the hydraulic pump is intermittently engaged to the vehicle motor.

If the hydraulic pump of an "on demand" system is engaged with the vehicle motor every time the operator requires power assist, the hydraulic pump would be engaging and disengaging very frequently. Therefore, what is needed is a power steering system in which the hydraulic pump is intermittently engaged to the vehicle motor only when necessary to pressurize the system to a desired level to provide power steering assist.

In a conventional hydraulic power steering system, a fluid valve arrangement directs pressurized fluid to either side of a piston in a hydraulic cylinder coupled to the steering mechanism to provide steering assist. When the operator turns the steering wheel, the system pressurizes one side of the piston, and fluidly connects the other side to a fluid reservoir, which is at a relatively low, atmospheric pressure. When the operator centers the wheel, each side of the piston fluidly connects to the reservoir. For some driving conditions such as when driving over pot holes and bumps, the driver may experience some driving instability in the center position since the steering system provides minimal damping to the hydraulic piston.

What is needed is an improved steering system that fluidly connects both sides of the piston in the hydraulic cylinder to a fluid to provide damping for the center position of the steering mechanism. This damping would also mitigate driving instability due to cross-steering linkage, tire vibration induced, suspension resonances. In addition, fluidly connecting both sides of the piston to each other rather than the reservoir in the center condition helps to minimize parasitic, fluid flow losses in the steering system. Therefore, what is yet further needed is an improved hydraulic power steering system that not only provides hydraulic cylinder damping during the center condition, but that also minimizes parasitic losses by fluidly connecting each side of the piston of the hydraulic cylinder.

Conventional hydraulic power steering systems supply the hydraulic cylinder with fluid pressurized to a high level that is suitable for driving situations requiring maximal steering assist. In many situations, however, the operator may only need a small or intermediate amount of steering assist, and it is not necessary to supply the hydraulic cylinder with highly pressurized fluid. What is still yet further needed, therefore, is an improved hydraulic power steering system, that provides low and/or intermediate pressures of fluid to the hydraulic cylinder.

SUMMARY

In a first aspect, an electrically actuated, hydraulic power steering system for a motorized vehicle is provided. The steering system comprises a hydraulic pump for generating hydraulic pressure, a hydraulic fluid reservoir, a hydraulic cylinder, and a control valve arrangement. The hydraulic cylinder has a first chamber of variable volume and a second chamber of variable volume, the first and second chambers separated by a movable piston. The control valve arrangement, which is operable in at least three conditions, selectively connects the first and second chambers of the hydraulic cylinder to the pump and the hydraulic fluid reservoir to drive the piston.

In a first operating condition, which corresponds to an assisted steering operation in a first direction, the control valve arrangement places the first chamber of the hydraulic cylinder in fluid communication with pump and the second chamber in fluid communication with the reservoir. In a second condition, which corresponds to an assisted steering operation in a second direction, the control valve arrangement places the first chamber in fluid communication with the reservoir and the second chamber in fluid communication with the pump. In a third condition, which corresponds to an on-center, no-steering-assist-required condition, the control valve arrangement places the first and second chambers in fluid communication with each other but not with the fluid reservoir.

In another aspect a hydraulic power steering system is provided comprising a hydraulic pump for generating hydraulic pressure, a hydraulic fluid reservoir, a hydraulic cylinder, a control valve arrangement, and a pressure accumulator selectively connected to the hydraulic pump and chargeable to a desired pressure less than the maximum output pressure of the pump. The hydraulic cylinder has a first chamber of variable volume and a second chamber of variable volume, the first and second chambers separated by a movable piston. The control valve arrangement, which is operable in at least three conditions, selectively connects the first and second chambers of the hydraulic cylinder to the pump, the hydraulic fluid reservoir and the pressure accumulator to provide power steering assist and pressurized damping.

In a first condition, which correspond to an assisted steering operation in a first direction, the first chamber is placed in fluid communication with the pump and the second chamber in fluid communication with the reservoir. In a second condition, which corresponds to an assisted steering operation in a second direction, the first chamber is placed in fluid communication with the reservoir and the second chamber in fluid communication with the pump. In a third condition, which corresponds to an on-center, no-steering operation, the first and second chambers are put in fluid communication with the pressure accumulator but not with the reservoir. Pressure supplied by the pressure accumulator to both the first and second chambers provides additional dampening to reduce unwanted vibrational inputs from the vehicle wheels.

In another aspect a hydraulic power steering system is provided comprising a hydraulic pump for generating hydraulic pressure, a hydraulic fluid reservoir, a hydraulic cylinder, a control valve arrangement, and a pressure accumulator selectively connected to the hydraulic pump and chargeable to a desired pressure less than the maximum output pressure of the pump. The control valve arrangement according to this aspect is operable to selectively connect the pressure accumulator or the pump to the hydraulic cylinder to provide power steering assist.

In a first operating condition according to this aspect, the control valve arrangement places the first chamber in fluid communication with the pressure accumulator and the second chamber in fluid communication with the reservoir. In a second condition, the control valve arrangement places the first chamber in fluid communication with the reservoir and the second chamber in fluid communication with the pressure accumulator. In a third condition, which corresponds to an on-center, no-steering operation, the control valve arrangement places the first and second chambers in communication with each other and further disconnects the first and second chambers from the fluid reservoir. In a fourth condition, corresponding to a high pressure steering operation in the first direction, the first chamber is placed in direct communication with the pump and the second chamber is placed in communication with the reservoir. In a fifth condition, the first chamber is placed in communication with the reservoir and the second chamber is placed in direct communication with the pump.

In another embodiment according to this aspect, an additional low pressure accumulator is provided to supply pressurized damping to the first and second chambers in the third condition, corresponding to a no-steering operation.

In another aspect a hydraulic power steering system is provided comprising a hydraulic pump for generating hydraulic pressure, a hydraulic fluid reservoir, a hydraulic cylinder, a control valve arrangement, a first pressure accumulator selectively connected to the hydraulic pump and chargeable to a first desired pressure, and a second pressure accumulator selectively connected to the hydraulic pump and chargeable to a second desired pressure, higher than the first pressure. The control valve arrangement according to this aspect is operable to selectively connect the first and second chambers of the hydraulic cylinder to the first or second pressure accumulators depending on the amount of pressure assist needed for a steering operation.

For a low pressure steering operation in the first direction, the control valve arrangement places the first chamber in fluid communication with the first pressure accumulator and the second chamber in fluid communication with the fluid reservoir. For a low pressure steering operation in the second direction, the control valve arrangement places the first chamber in fluid communication with the fluid reservoir and the second chamber in fluid communication with the first pressure accumulator. If additional pressure is needed to assist a steering operation in the first direction, the control valve arrangement places the first chamber in fluid communication with the second pressure accumulator and the second chamber in fluid communication with the fluid reservoir. For a higher pressure steering operation in the second direction, the control valve arrangement places the first chamber in fluid communication with the fluid reservoir and the second chamber in fluid communication with the second pressure accumulator.

In other possible embodiments, additional pressure accumulators that are charged to different pre-selected pressures may be used to provide a range of steering assist pressures.

BRIEF DESCRIPTION OF DRAWINGS

These and other features, aspects, and advantages will become more readily apparent with reference to the following detailed description when read in conjunction with the accompanying drawings. The drawings referred to herein will be understood as not being drawn to scale, except if specifically noted, the emphasis instead being placed upon illustrating the principles of the invention. In the accompanying drawings:

FIG. 4 is a schematic representation of an electrically actuated, hydraulic power steering system according to a fourth aspect;

DETAILED DESCRIPTION

Figure 1A:
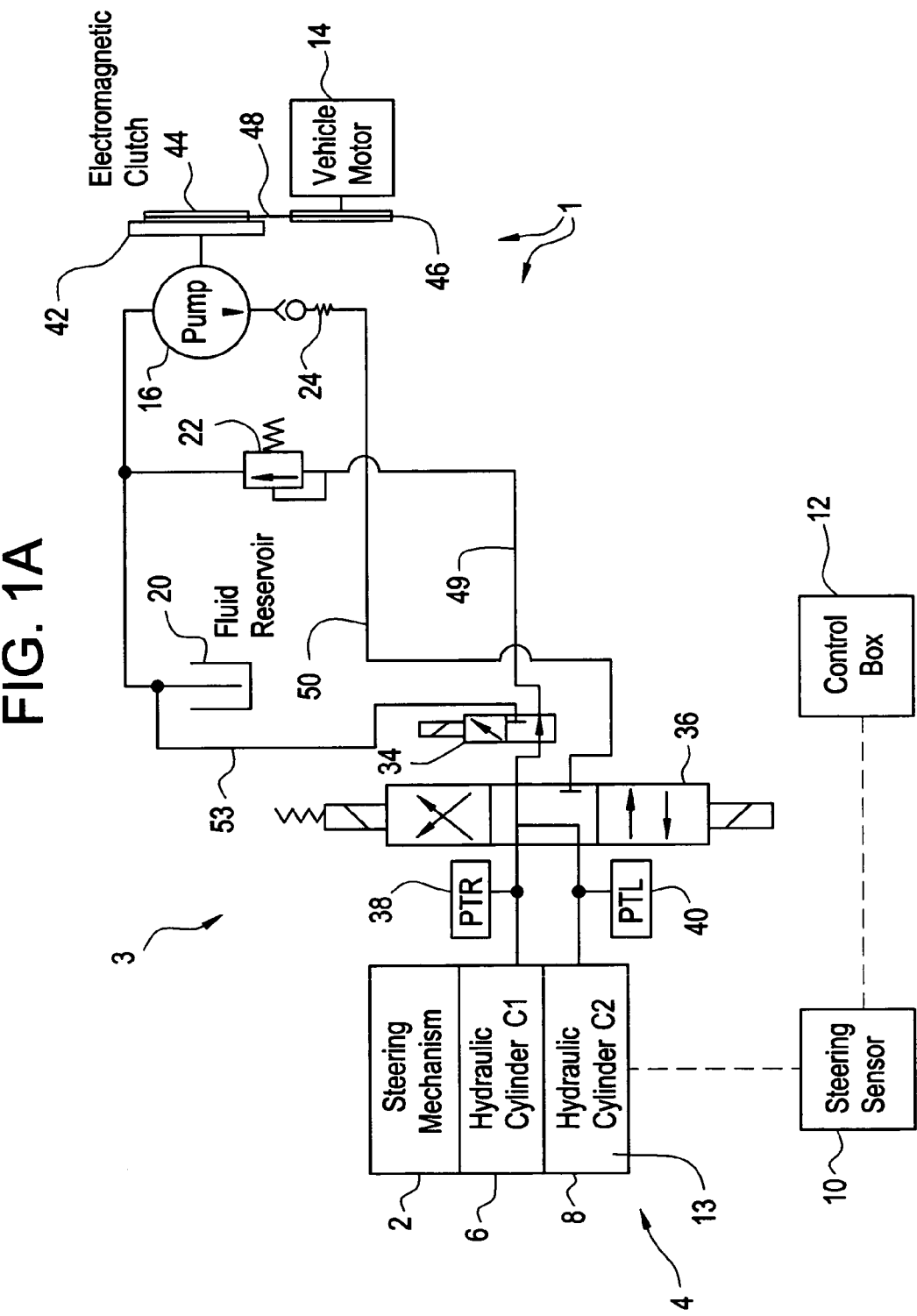
FIGS. 1a-1c are schematic representations of an electrically actuated, hydraulic power steering system according to a first aspect in various operating conditions.

FIG. 1a is a schematic of an electrically actuated, hydraulic power steering system 1 for a motorized vehicle such as an automobile. Steering system 1 generally comprises a hydraulic cylinder 4, a hydraulic pump 16, a fluid reservoir 20, and a control valve arrangement 3. Hydraulic cylinder 4 comprises a first chamber 6 of variable volume, a second chamber 8 of variable volume and a movable piston 13 that separates the first chamber 6 and the second chamber 8. The movable piston 13 of the hydraulic cylinder 4 is mechanically coupled to a conventional steering mechanism 2, which operatively connects by any one of a number of conventional means to the steerable wheels of the motorized vehicle. As is well known in the art, by supplying hydraulic pressure to either the first or second chamber of the hydraulic cylinder 4, while at the same time venting the opposite chamber to the fluid reservoir 20, significant force can be exerted on the piston 13 to provide steering assist to the steering mechanism.

Steering system 1 is an "on-demand" system that conserves vehicle motor power and facilitates long life of hydraulic pump 16 and other system components. A steering sensor 10, which may be a torque sensor, provides signals to control box 12 to indicate the need for steering assist in either the left or right direction. A first pressure transducer 38 measures fluid pressure in first chamber 6 of hydraulic cylinder 4, and a second pressure transducer 40 measures fluid pressure in second chamber 8 of hydraulic cylinder 4, each transmitting signals to control box 12. Control box 12 uses conventional microprocessor technology to actuate the control valve arrangement 3 and pump 16 in response to signals received from the steering sensor 10 and/or the first and second pressure transducers 38, 40. (For clarity, many of the electrical conductors are not shown in the figures.)

Vehicle motor 14 drives motor pulley 46, which in turn drives clutch pulley 44 via belt 48. Clutch pulley 44 attaches to an electromagnetic clutch 42, which selectively engages hydraulic pump 16 with vehicle motor 14 when electrically commanded by control box 12. In this manner, pump 16 is run only intermittently, which conserves power.

Referring again to FIGS. 1a-1c, a pump direct line 50 fluidly connects hydraulic pump 16 to a control valve arrangement 3, which in the embodiment shown includes a directional valve 36 and a reservoir valve 34. The directional valve 36 may be, as in FIG. 1a, a solenoid activated, 2×2, three-position valve, although the same functionality may be accomplished using a plurality of separate, solenoid actuated valves. As used herein, "2×2 valve" means a valve having two input paths and two output paths. Whether a path is an input path or an output path depends only on the direction of the fluid flow through the valve during a particular operating condition. As used herein, a "three-position valve" means a valve having three operating conditions corresponding to three combinations of fluid connections between the input and output paths. The reservoir valve 34 may be a solenoid activated, 1×2, two position valve.

A first check valve 24 in pump direct line 50 prevents the backflow of fluid into hydraulic pump 16. Fluid pressure provided by fluid pump 16 may be for example in the range of 1000-1800 psi. A reservoir line 53 and a pressure relief line 49 fluidly connect fluid reservoir 20 to control valve arrangement 3.

Figure 1B:
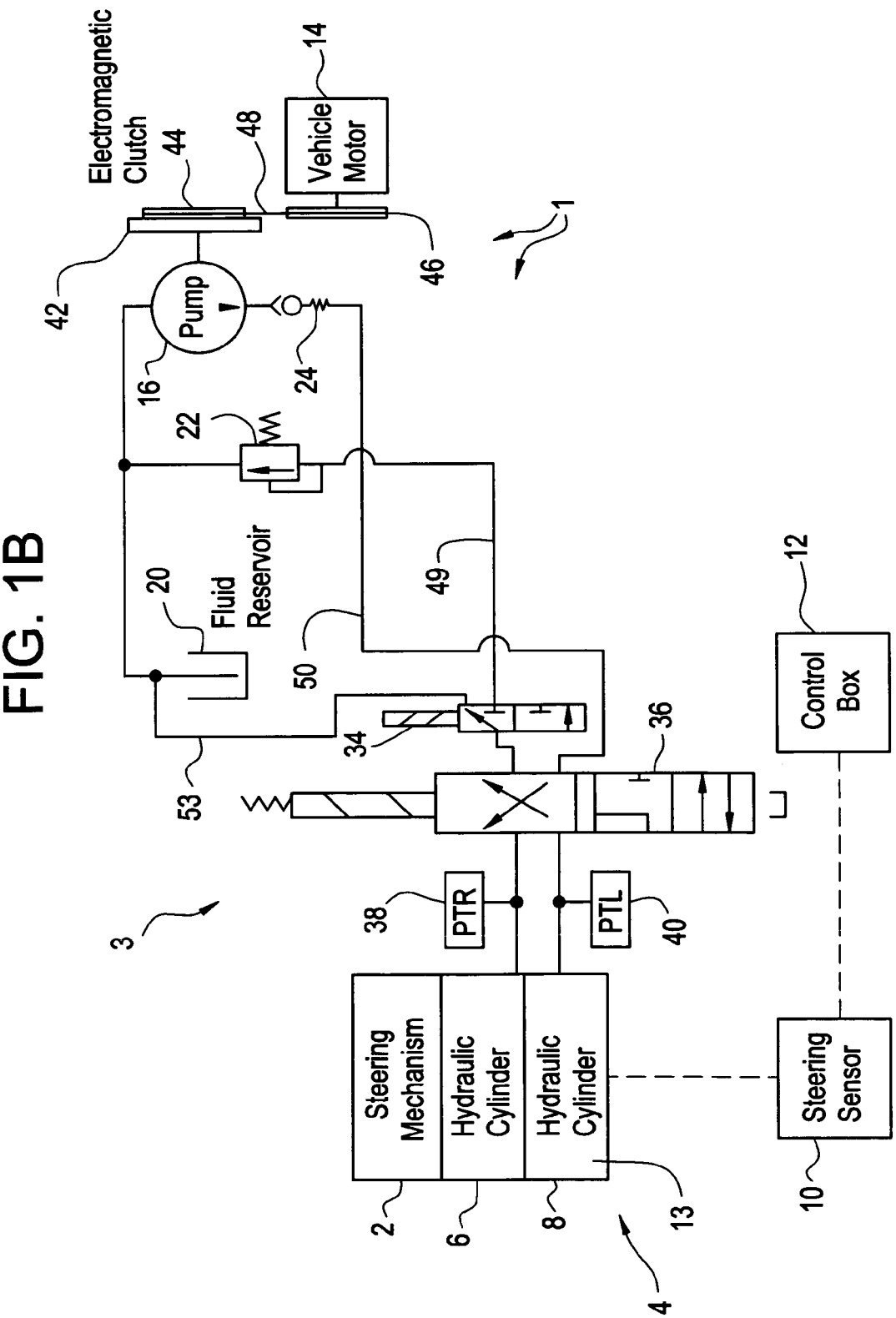
Figure 1C:
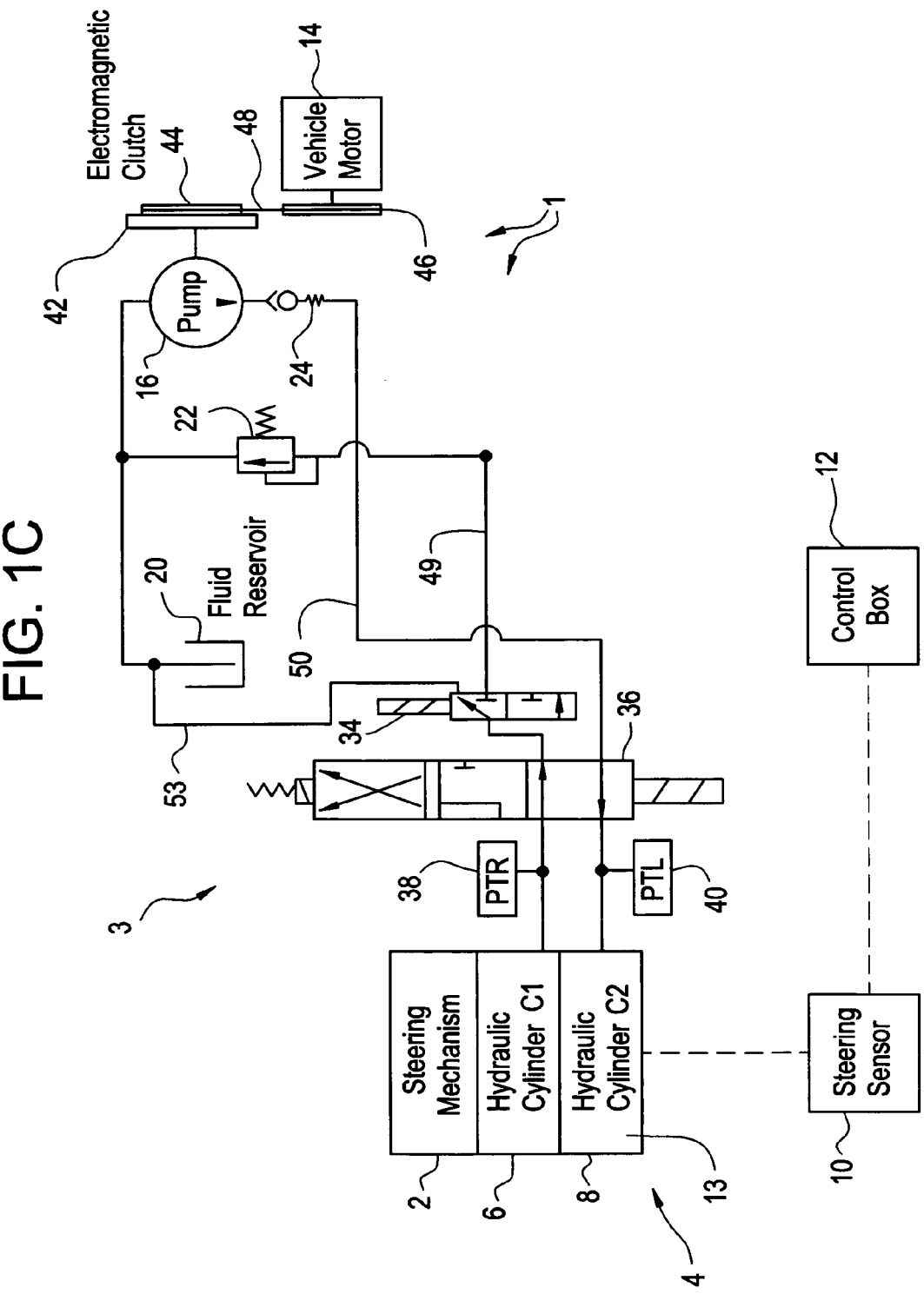

As shown in FIGS. 1a-1c, control valve arrangement 3 is operable in at least three conditions. Referring to FIG. 1a, in an on-center condition (corresponding to no-steering-assist), the directional valve 36 of the control valve arrangement 3 disconnects the pump 16 from the hydraulic cylinder 4 and connects the first chamber 6 of the hydraulic cylinder 4 to the second chamber 8. The reservoir valve 34 of the control valve arrangement 3 disconnects the hydraulic cylinder 4 from the reservoir line 53 and connects the hydraulic cylinder 4 to the relief line 49. Hydraulic fluid is permitted to flow back and forth between the first chamber 6 and the second chamber 8, but does not flow to the reservoir.

By disconnecting the first and second chambers 6, 8 of the hydraulic cylinder from the fluid reservoir 20 when no steering assist is required, a low residual fluid pressure in the hydraulic cylinder 4 from a prior steering maneuver is preserved. This is a substantial improvement over conventional systems, which vent the chambers of the hydraulic cylinder in the on-center (i.e., no steering) condition. First, the residual low pressure fluid in the hydraulic cylinder 4 provides damping to improve steering stability in response to inputs from the road through the vehicle wheels. Second, the new system provides faster response when steering assist is required since the starting pressure in the chambers of the hydraulic cylinder 4 will be greater than atmospheric pressure. If fluid pressure in the relief line 49 reaches a predetermined maximum, as a result of, for example, an impact from the road transferred through the steering mechanism 2, a relief valve 22 activates to vent pressure to the reservoir 20.

Referring now to FIG. 1b, when power assist is required for steering in a first direction, control valve arrangement 3 switches to another operating condition. In this condition directional valve 36 activates to connect the first chamber 6 to the pump 16 through the pump direct line 50 and the second chamber 8 to the reservoir valve 34. The reservoir valve 34 activates to connect the second chamber 8 to the fluid reservoir 20 through the directional valve 36, the reservoir valve 34 and the reservoir line 53. In this embodiment the electromagnetic clutch 42 activates to operate pump 16 whenever the need for steering assist is detected. As is well known in the field of power-assist steering, the application of high pressure to the first chamber 6 and the venting of pressure in the second chamber 8 causes movement of the cylinder's piston with a force to assist steering.

When power assist is required for steering in a second direction, the control valve arrangement 3 switches to another operating condition depicted in FIG. 1c. In this condition directional valve 36 activates to connect the second chamber 8 to the pump 16 and the first chamber 6 to the reservoir valve 34. The reservoir valve 34 activates to connect the first chamber 6 to the fluid reservoir 20 through the directional valve 36, the reservoir valve 34 and the reservoir line 53.

If reservoir valve 34 should fail to actuate during an assisted steering operation, pressure relief valve 22 provides an emergency flow path for fluid from hydraulic cylinder 4 to fluid reservoir 20, thus preventing steering system 1 from locking-up.

Figure 2:
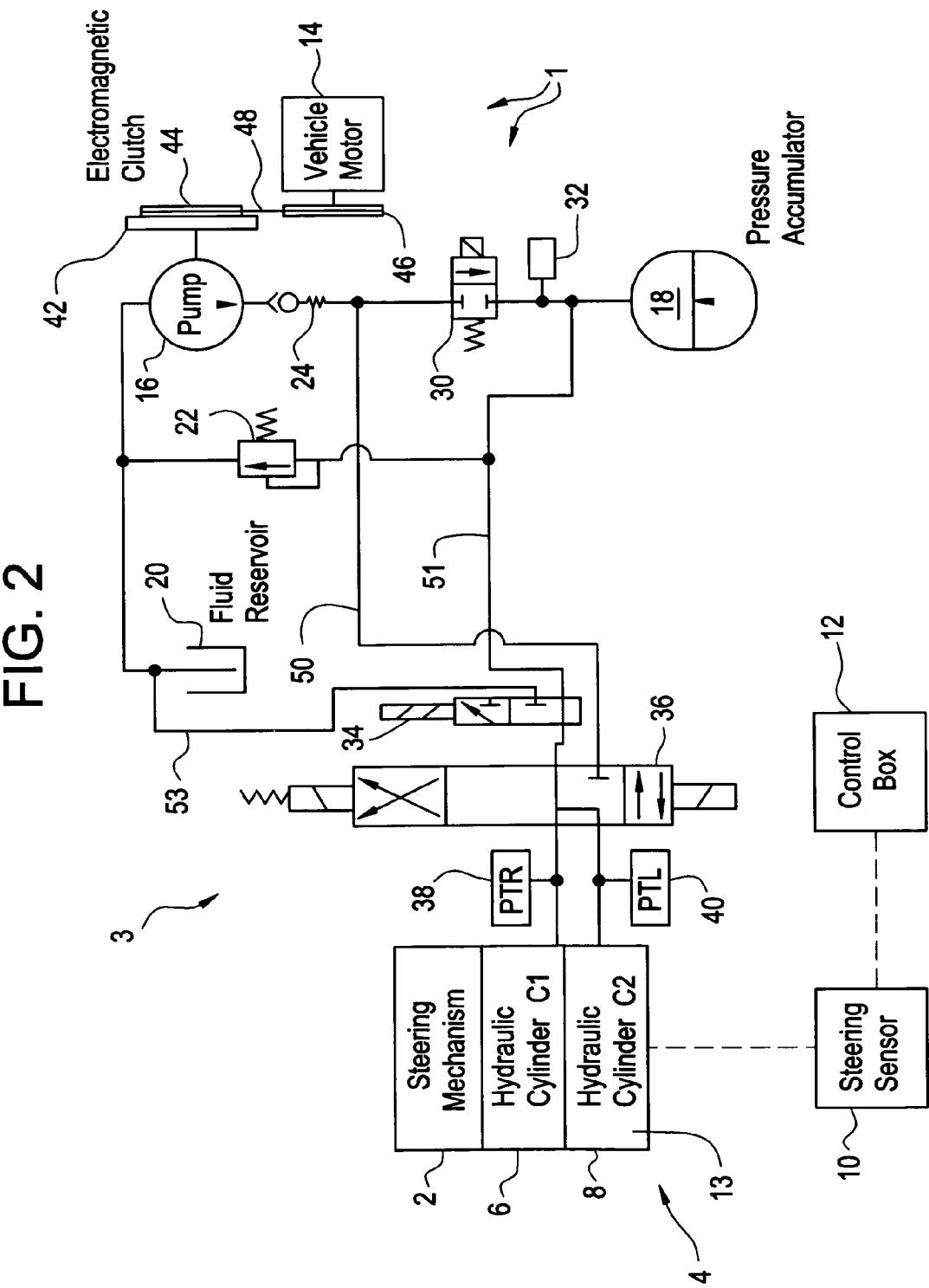
FIG. 2 is a schematic representation of an electrically actuated, hydraulic power steering system according to a second aspect.

FIG. 2 is a schematic representation of an electrically actuated, hydraulic power steering system according to another aspect, similar to FIG. 1, but further including a pressure accumulator 18. In the on-center condition, when no power steering assist is required, first chamber 6 and second chamber 8 are fluidly connected through pressure line 51, reservoir valve 34, and directional valve 36 to pressure accumulator 18 and are disconnected from the reservoir 20. In this manner, the first and second chambers 6, 8 of the hydraulic cylinder remain under pressure supplied by the accumulator 18 to improve responsiveness and to provide damping. During a steering operation, when power assist is required, responsiveness is improved by the fact that the starting pressure in the chambers is already above ambient pressure.

A desired pressure in the pressure accumulator 18 is maintained using a solenoid operated, accumulator valve 30 (normally closed/unconnected) and an accumulator pressure transducer 32, which transmits signals to control box 12. When pressure transducer 32 detects a pressure in accumulator 18 lower than desired, control box 12 activates accumulator valve 30 to open a fluid path between pump 16 and accumulator 18. Control box 12 further activates clutch 42 so as to recharge accumulator 18 using the pump 16. In one embodiment the fluid pressure in accumulator 18 may be approximately in the range of 100 to 300 psi, although other intermediate pressure ranges are possible. Relief valve 22 in this embodiment is set to open at a pressure greater than the desired pressure in the pressure accumulator 18.

FIGS. 3a-3e depict one embodiment of a hydraulic power steering system according to another aspect, in which a pressure accumulator is selectively connectable to the first and second chambers 6, 8 to provide steering assist. In the embodiment shown, pressure for a steering operation may be provided by a pressure accumulator 56, rather than directly from the pump 16. A significant advantage of this system is that the pump 16 need not run every time power assist is required for a steering operation. Instead, the pump may be operated selectively when necessary to recharge pressure in the accumulator, i.e., when the accumulator pressure drops below a desired level. In an emergency steering operation, when maximum power steering assist is required, the first or second chambers 6, 8 may be selectively connected directly to the pump.

A desired pressure in the second pressure accumulator 56 is maintained using a solenoid operated, accumulator valve 52 (normally closed/unconnected) and an accumulator pressure transducer 54, which transmits signals to control box 12. When pressure transducer 54 detects a pressure in accumulator 56 lower than desired, control box 12 activates accumulator valve 52 to open a fluid path between pump 16 and accumulator 56. Control box 12 further activates clutch 42 so as to recharge accumulator 56 using the pump 16. In one embodiment the fluid pressure in accumulator 56 may be in the range of 400 to 600 psi, although other intermediate pressure ranges are possible.

The control valve arrangement 3 according to this aspect is operable in at least five conditions and includes an accumulator bypass valve 28 in the pump direct line 50 and an accumulator source valve 58 in an accumulator source line 59. The directional valve 36 in combination with the accumulator bypass valve 28 and the accumulator source valve 58 selectively connect to the pump 16 or the accumulator 56 as the source of fluid pressure. In a first condition, shown in FIG. 3a, when no steering assist is required, the control valve arrangement 3 connects the first and second chambers 6, 8 of the hydraulic cylinder 4 to each other and to a pressure relief valve 22 as in the embodiment depicted in FIG. 1a. The pump 16 in this condition does not run except as required to charge the accumulator 56. In an alternate embodiment depicted in FIG. 4, an additional low pressure accumulator 18 may be used to provide on-center damping as in the embodiment shown in FIG. 2.

Figure 3A:
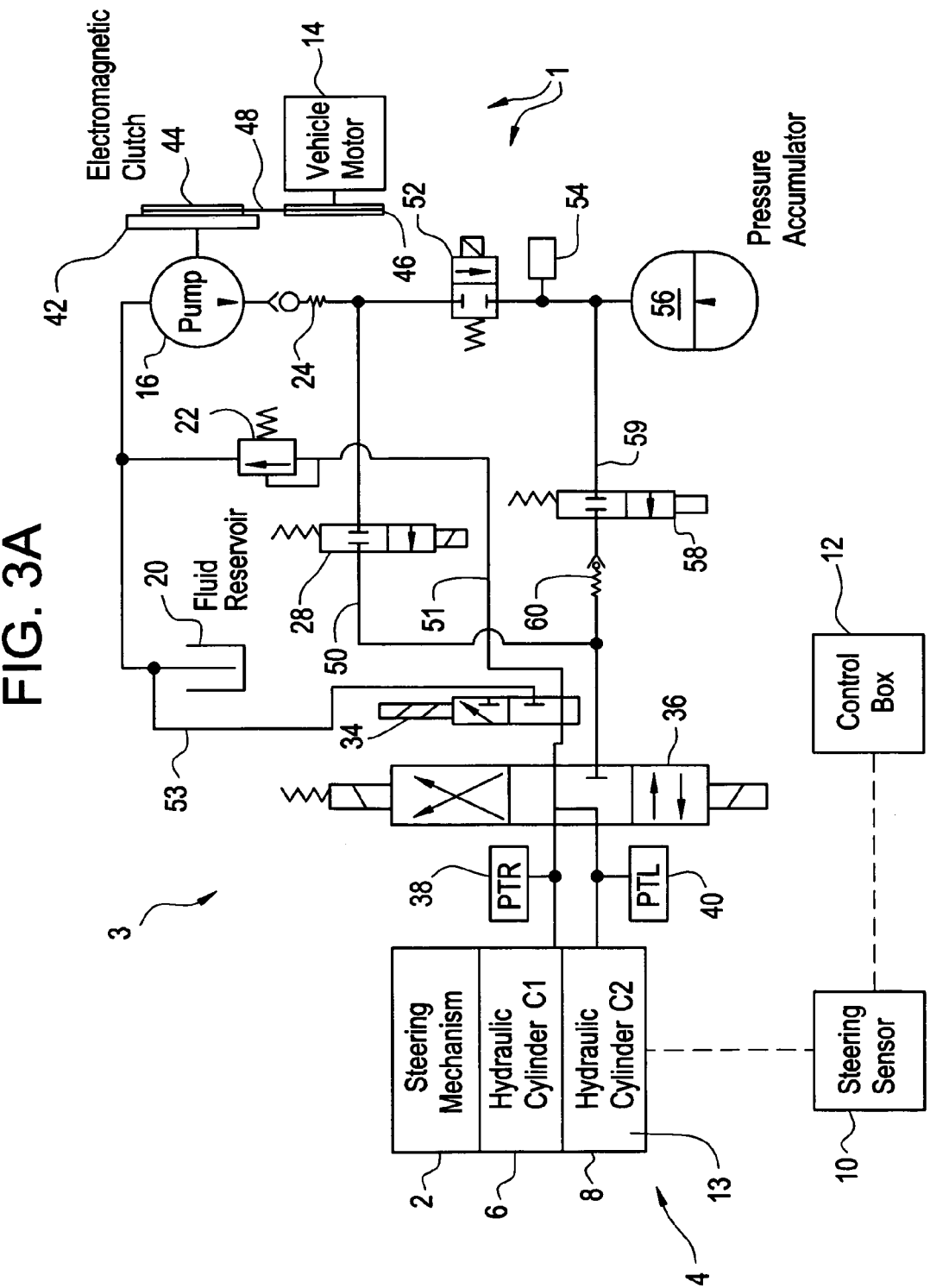
FIGS. 3a-3e are schematic representations of an electrically actuated, hydraulic power steering system according to a third aspect in various operating conditions.
Figure 3B:
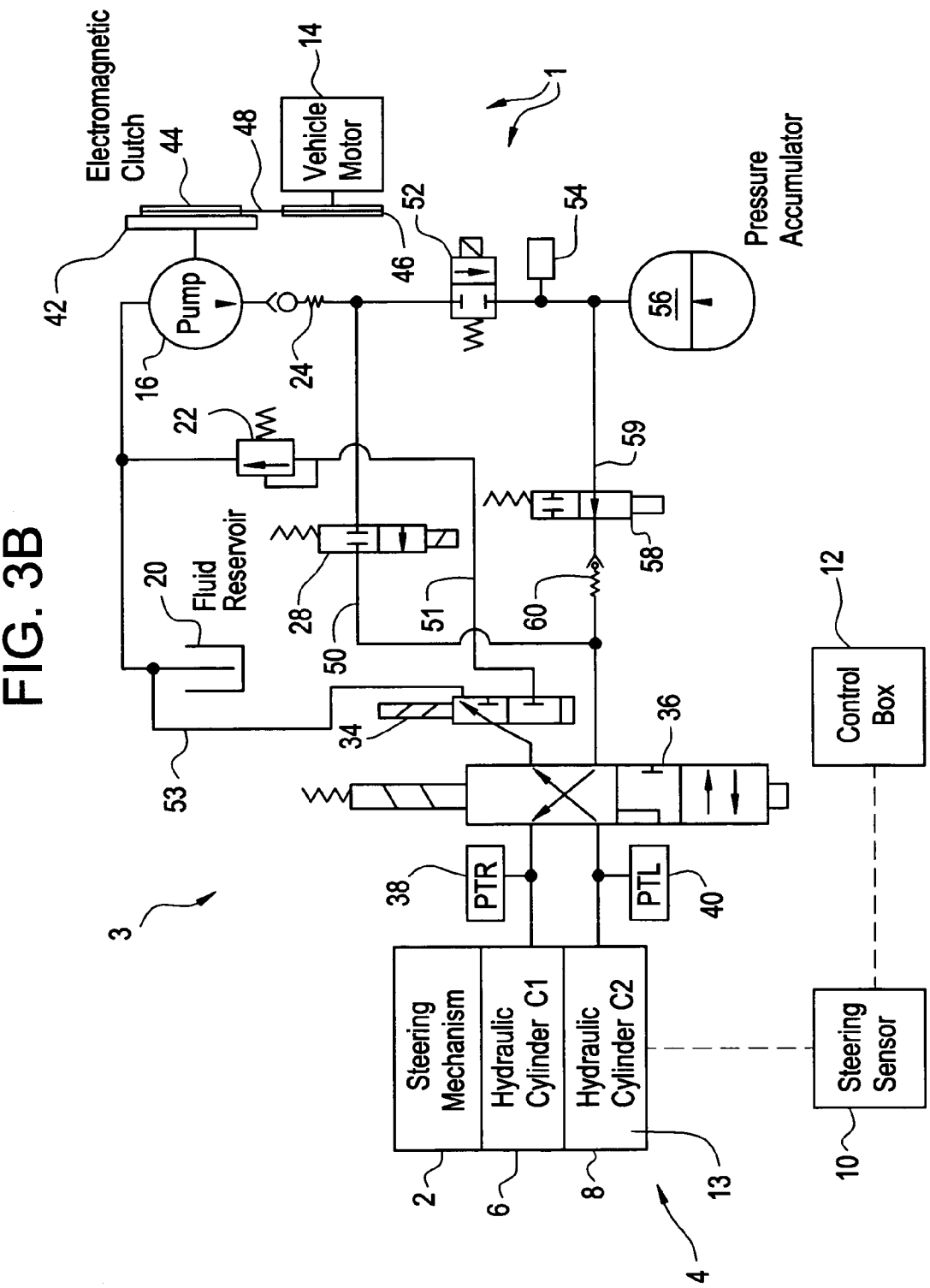

Referring to FIG. 3b, in a second condition corresponding to a low pressure steering operation in a first direction the directional valve 36 activates to connect the first chamber 6 to a pressure source line and the second chamber 8 to the reservoir valve 34. Accumulator source valve 58 activates to connect the accumulator 56 to the first chamber 6 through the accumulator source line 59 and the directional valve 36. Accumulator bypass valve 28 remains closed to disconnect the pump 16 from the directional valve 36 and the hydraulic cylinder 4. In this manner, the pump 16 may be activated to charge the accumulator as needed without also exerting high fluid pressure on the hydraulic cylinder 4. The reservoir valve 34 in this condition also activates to connect the second chamber 8 to the reservoir 20 through the reservoir line 53. A second check valve 60 between the directional valve 36 and the accumulator source valve 58 prevents backflow from the hydraulic cylinder 4 into the accumulator 56.

Figure 3C:
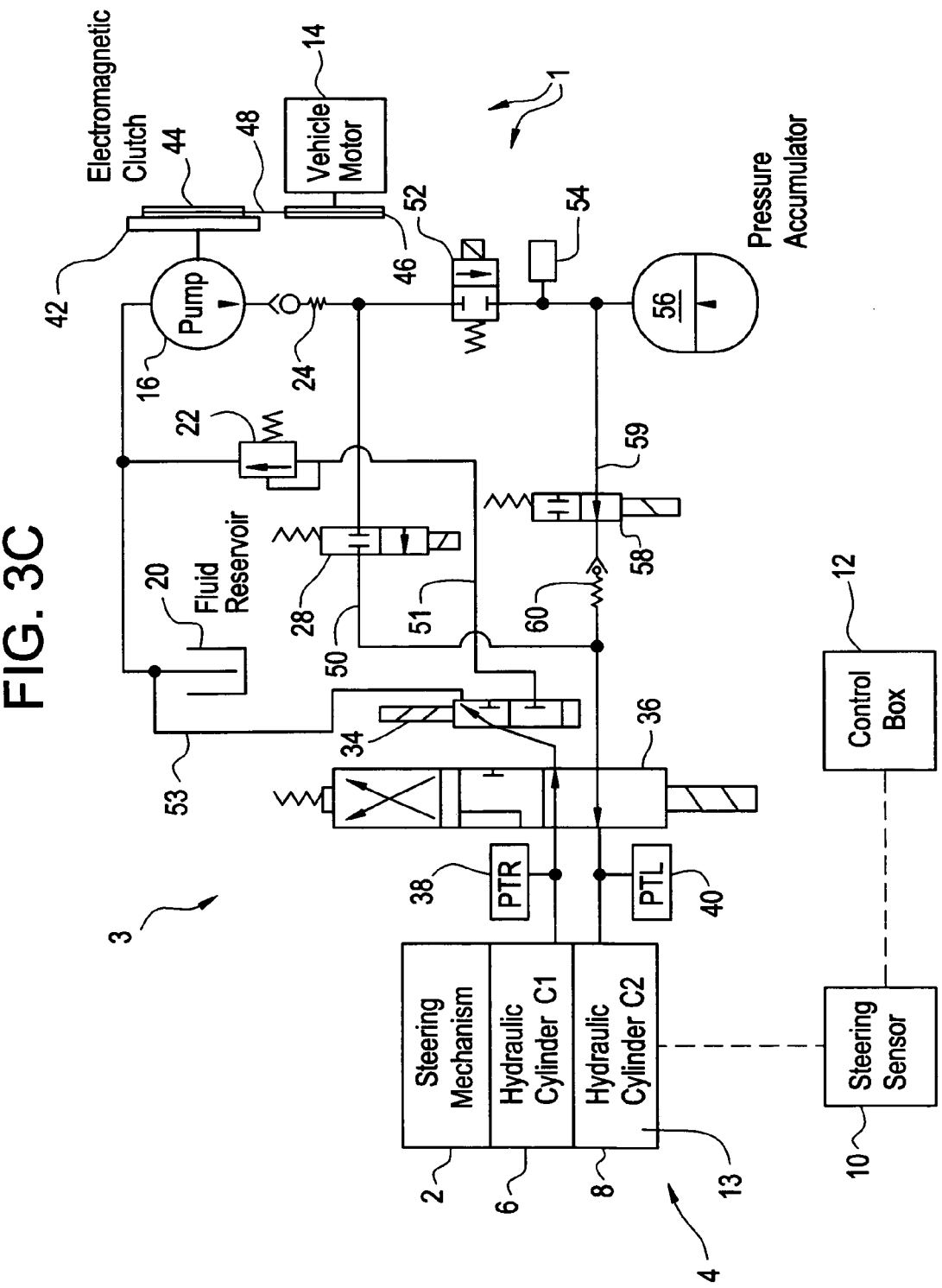

FIG. 3c depicts a third condition corresponding to a low pressure steering operation in a second direction. In this condition the directional valve 36 activates to connect the second chamber 8 to a pressure source line and the first chamber 6 to the reservoir 20 through the reservoir valve 34. The accumulator source valve 58 activates to connect the accumulator 56 to the second chamber 8 through the accumulator source line 59. The accumulator bypass valve 28 remains closed.

Figure 3D:
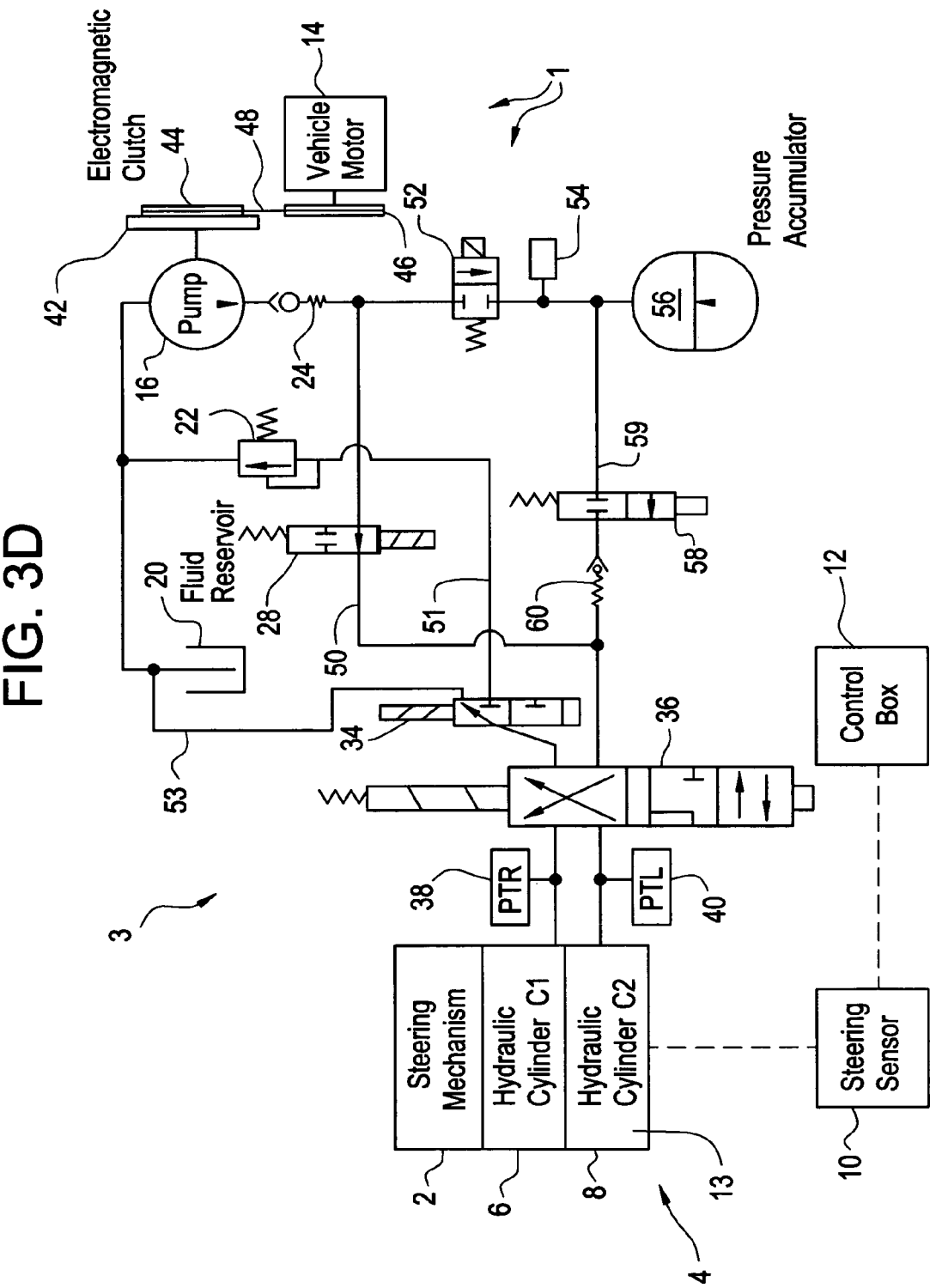

When more steering assist is required than can be supplied by the pressure stored in the pressure accumulator 56, the pump 16 may be activated and connected directly to a chamber in the hydraulic cylinder 4. FIG. 3d depicts a fourth condition corresponding to a high pressure steering operation in a first direction. In this condition directional control valve 36 is activated to connect the first chamber 6 to a pressure source line and the second chamber 8 to the reservoir valve 34. Reservoir valve 34 activates to connect the second chamber 8 to the reservoir 20 through the reservoir line 53. Accumulator bypass valve 28 activates to connect the pump 16 to the first chamber 6 through the pump direct line 50. Accumulator source valve 58 remains closed to disconnect the accumulator 56 from the directional control valve 36 and the high pressure in the pump direct line 50. The clutch 42 activates in response to a signal from control box 12 to engage the pump 16 with the motor 14.

Figure 3E:
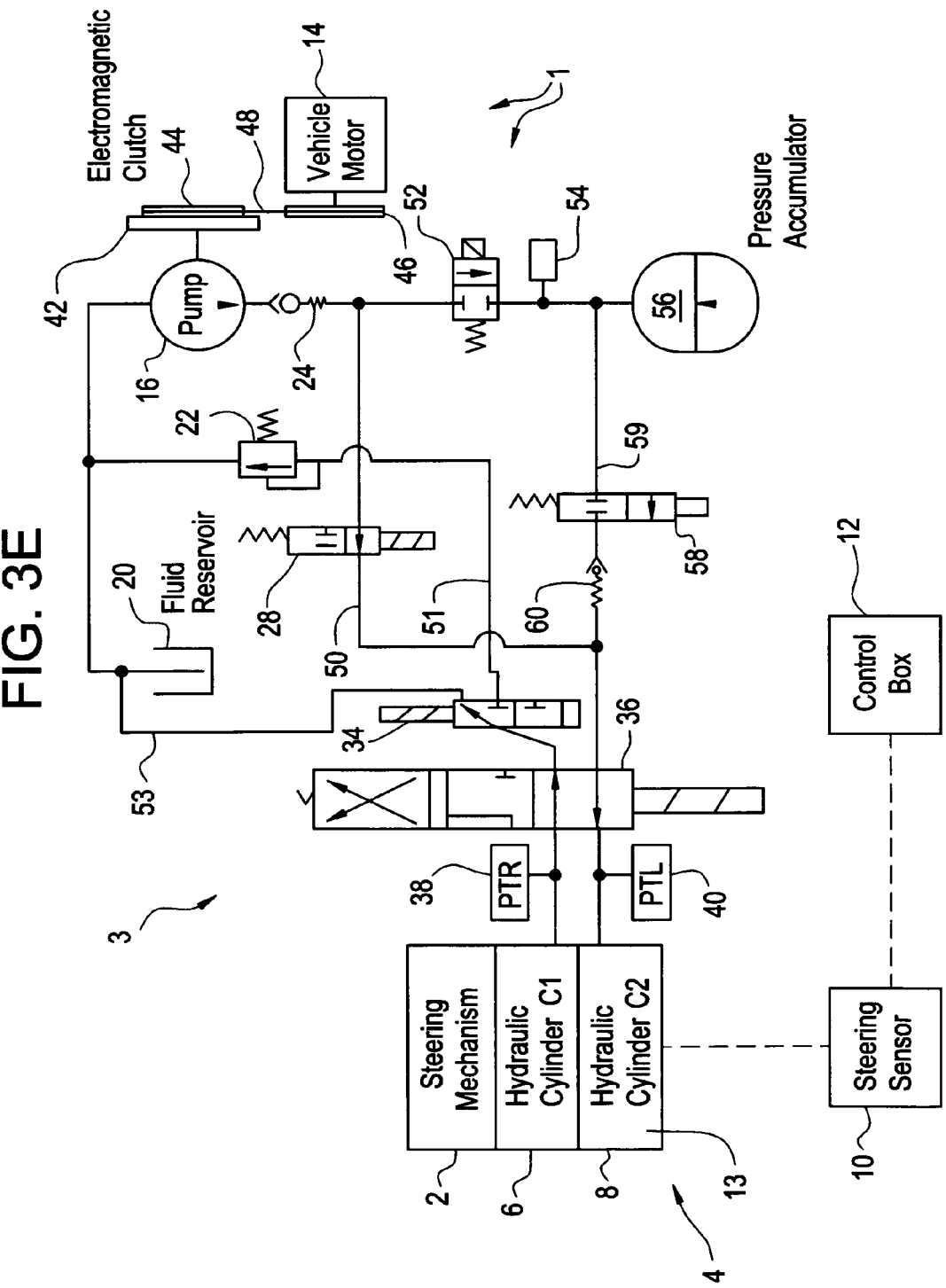

FIG. 3e shows yet another condition corresponding to a high pressure steering operation in a second direction. This condition differs from the condition depicted in FIG. 3d only in that the second chamber 8, rather than the first chamber 6, is connected to the pump direct line 50, and the first chamber 6, rather than the second chamber 8, is connected to the reservoir 20.

Figure 5:
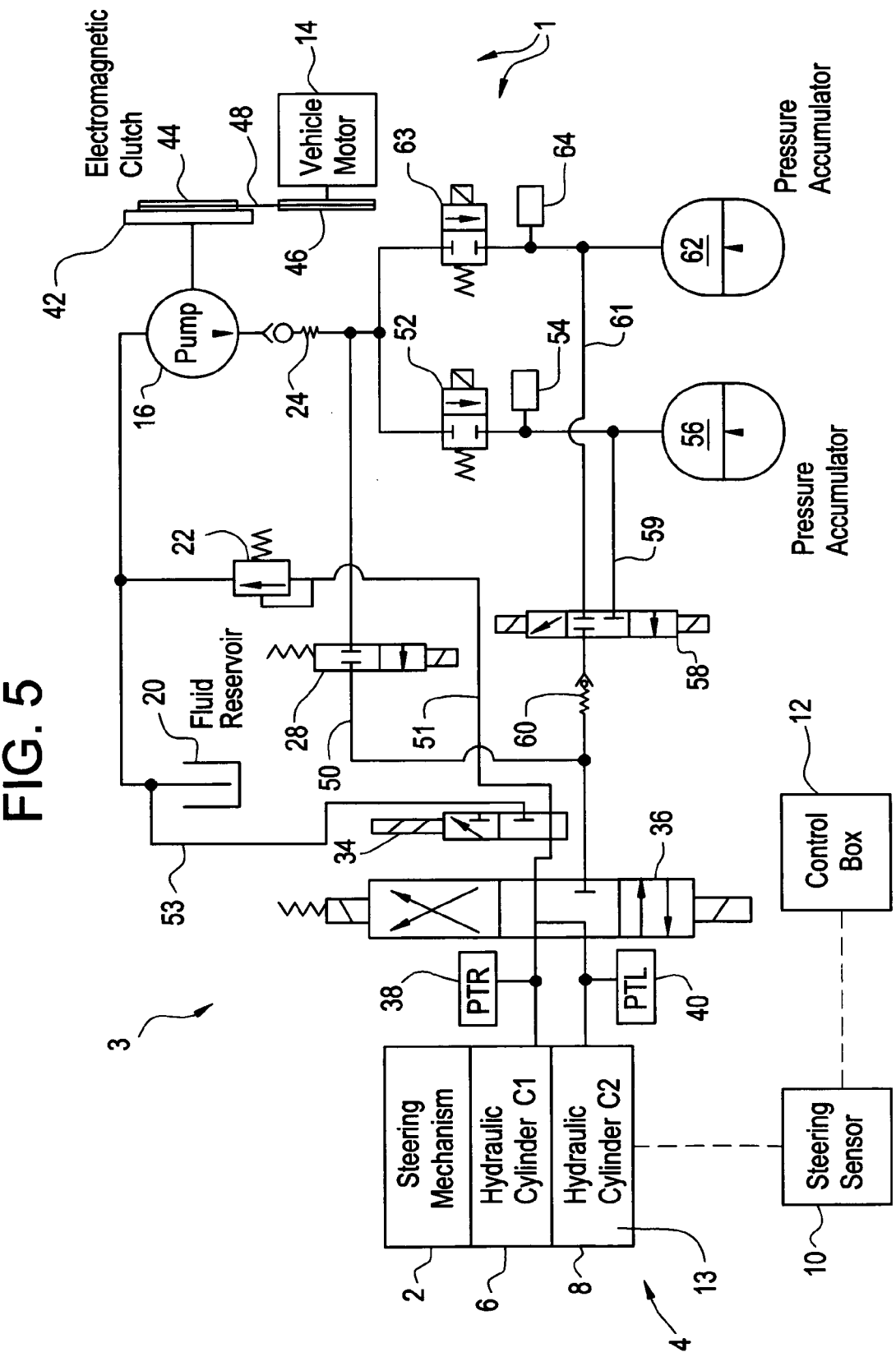
FIG. 5 is a schematic representation of an electrically actuated, hydraulic power steering system according to a fifth aspect.

According to another aspect, additional pressure accumulators may be added to provide a range of available assist pressures. In the embodiment shown in FIG. 5, another pressure accumulator 62 is provided and is chargeable to a desired pressure greater than the pressure in accumulator 56 but lower than the maximum pressure supplied directly from the pump 16. The control valve arrangement 3 includes an accumulator control valve 57 that is normally closed but which, when activated, may selectively connect the directional valve 36 to accumulator 56 through accumulator source line 59 or accumulator 62 through accumulator source line 61. The accumulator control valve 57 may be, as depicted in FIG. 5, a solenoid activated, 1×2, three-position valve. Alternatively, the same functionality could be achieved by a series of separate solenoid valves.

A desired pressure in accumulator 62 is maintained by an accumulator solenoid valve 63 and an accumulator pressure transducer 64 in the same manner described with respect to accumulators 18 and 56 in the embodiments of FIGS. 2 and 3a-3e. In one embodiment, accumulator 62 is charged to a range of 600 to 1800 psi, although other pressure ranges may be used.

Figure 6:
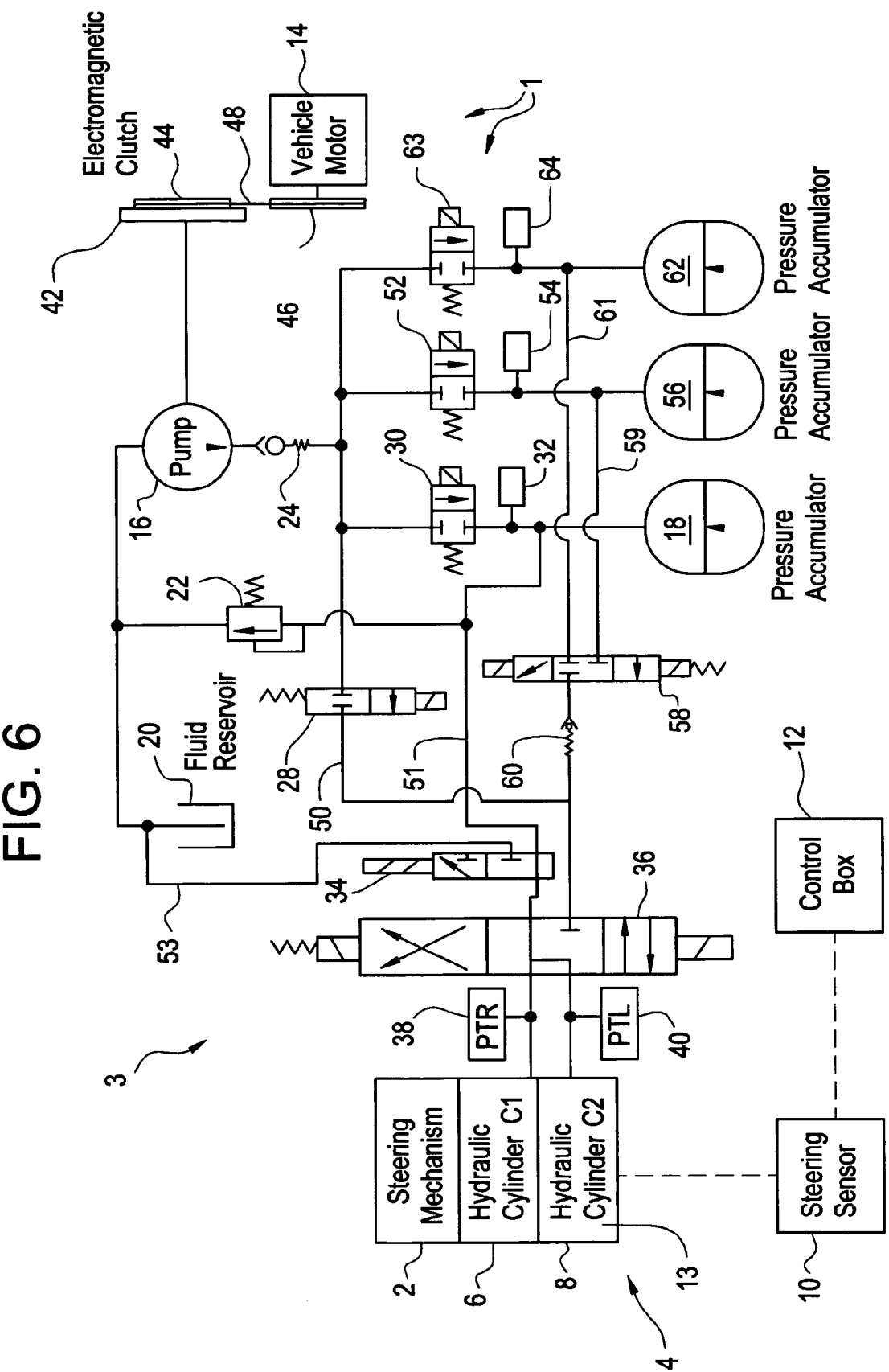
FIG. 6 is a schematic representation of an electrically actuated, hydraulic power steering system according to another aspect.

The system of FIG. 5 operates in substantially the same manner as the preceding embodiments in FIGS. 3a-3e. When activated, directional valve 36, accumulator control valve 57, and accumulator bypass valve 28 selectively connect the first chamber 6 or second chamber 8 to accumulator 56, accumulator 62, or the pump 16 to provide steering assist as needed. Accumulator 56 is connected to the hydraulic cylinder 4 when only a low pressure steering assist is required. Accumulator 62 is connected to the hydraulic cylinder 4 when an intermediate pressure steering assist is needed. The pump 16 is connected directly to the hydraulic cylinder 4 when a high pressure steering assist is required, as in an emergency steering operation. In an alternate embodiment shown in FIG. 6, an additional low pressure accumulator 18 may be used to provide on-center pressurized damping as previously described with respect to FIGS. 2 and 4.

In other embodiments, which are not shown, additional pressure accumulators possessing a range of pressures may be added to provide a range of available pressure assists.

Figure 7:
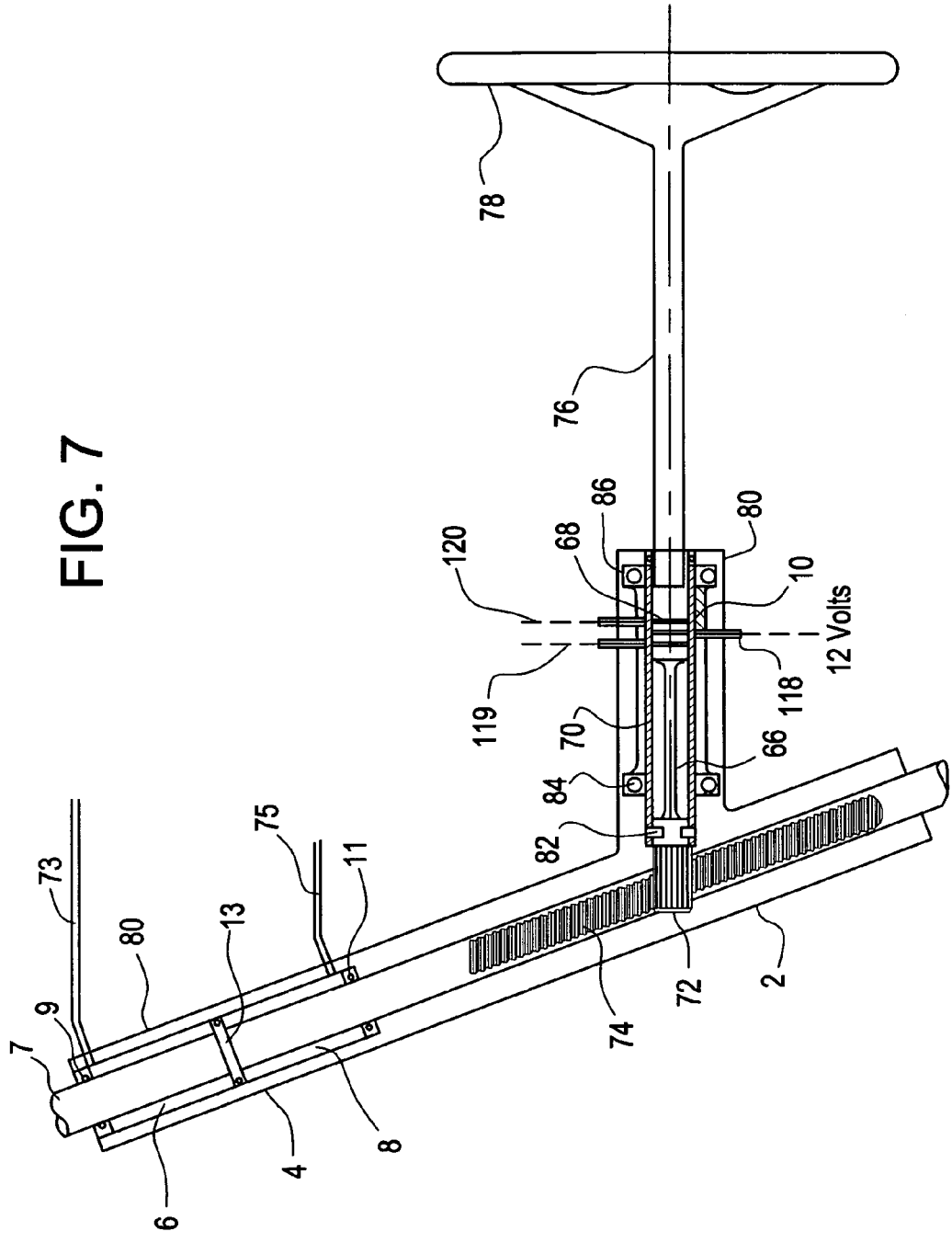
FIG. 7 is a sectional view of a first steering mechanism suitable for use with the power steering systems shown schematically in FIGS. 1-6.
Figure 8:
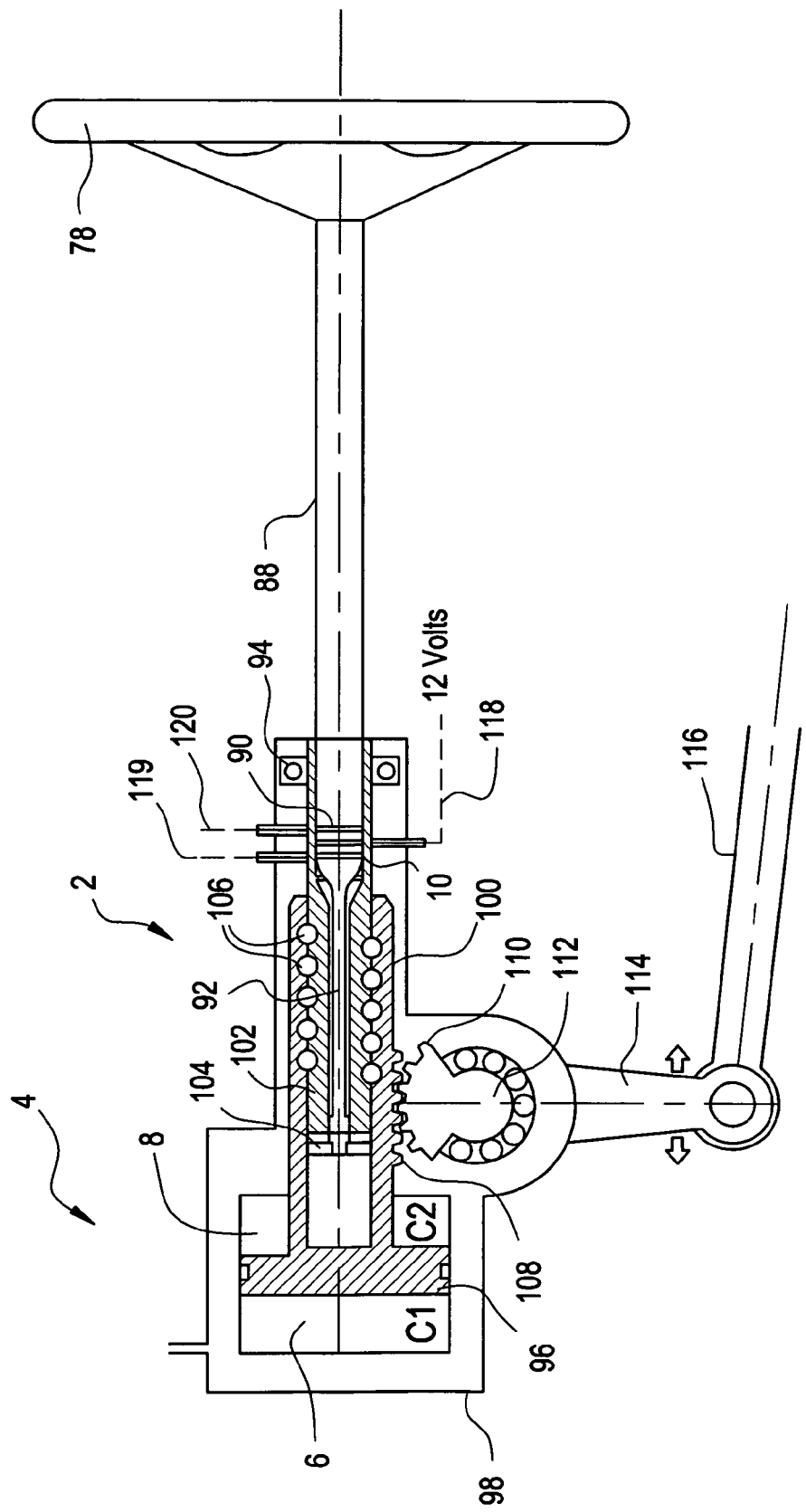
FIG. 8 is a sectional view of a second steering mechanism suitable for use with the power steering systems shown schematically in FIGS. 1-6.

FIGS. 7 and 8 show sectional views of steering mechanisms 2 suitable for use with the steering systems of FIGS. 1-6. The steering mechanism 2 of FIG. 7, commonly referred to as a rack and pinion steering mechanism, comprises a gear rack 74 disposed on a steering mechanism shaft 7 within a housing 80. Steering mechanism shaft 7 extends through hydraulic cylinder 4. A piston 13 mounted on shaft 7 moves either right or left along the longitudinal axis of hydraulic cylinder 4. A first seal 9, housing 80, and piston 13 define first chamber 6, which has a variable volume. A second seal 11, housing 80, and piston 13 define second chamber 8, which has a variable volume. A first chamber line 73 fluidly connects first chamber 6 to directional assist valve 36 of steering system 1. A second chamber line 75 fluidly connects second chamber 8 to directional assist valve 36. A pinion gear 72 operatively engages gear rack 74 and attaches to a pinion cylinder 70 by a pin 82. A first bearing 84 and a second bearing 86 support pinion cylinder 70 in housing 80. Pinion gear 72 attaches to a steering shaft 76 (that is attached to a steering wheel 78) with a torsion bar 66 having a reduced cross sectional area, so that for a certain threshold torque on steering shaft 76, there is a relative, rotational movement between steering shaft 76 and pinion cylinder 70. For vehicles requiring more steering assist, torsion bar 66 may be provided with a smaller diameter or increased length than what is shown in FIG. 7. Conversely, for vehicles requiring less steering assist, torsion bar 66 may be provided with a larger diameter or shorter length.

To measure the relative, rotational movement of torsion bar 66, steering wheel sensor 10 includes multiple electrical contacts that close sequentially as the torsion bar winds up. In combination with a high level algorithm programmed into control box 12, sensor 10 provides improved control of steering system 1, as compared to conventional steering assist systems that utilize the relative motion of the torsion bar to control fluid flow. Increments of relative, rotational movement between steering shaft 76 and pinion gear 72 is detectable by steering sensor 10 disposed inside of steering mechanism 2. Steering sensor 10 includes at least one switch element 68 affixed to the distal end of steering shaft 76, and aligned axially with a first element conductor 118, which is electrically connected to the electric power source (such as the 12 volt battery) in the vehicle. When the operator turns steering wheel 78 in a first direction, and a first increment of relative, rotational movement occurs, first electrical conductor 118 electrically connects to a second electrical connector 119, and transmits a first signal to control box 12. The electrical current may be low, approximately 10 milliampere, for example, to minimize contact arcing of switch element 68. Control box 12 amplifies this signal to cause control valve arrangement 3 to change to the appropriate condition as described earlier, corresponding to the first level of steering assist. When the operator turns steering wheel 78 in the first direction, and encounters a second, higher steering resistance, a second increment of relative, rotational movement occurs, causing steering sensor 2 to transmit a second signal to control box 12. Control box 12 again commands control valve arrangement 3 to change to the appropriate condition corresponding for the second level of steering assist. A third level of steering assist may be achieved in a similar manner. When the operator turns steering wheel 78 in the second direction, first electrical conductor 118 electrically connects with a third electrical conductor 120, and the three levels of steering assist may be obtained as before, except for the opposite turning direction. Once the torque on steering shaft 88 decreases sufficiently to reduce the twisting of torsion bar 66, control box 12 automatically changes control valve arrangement 3 to a lower level of steering assist. When the operator no longer requires steering assist, steering system 1 goes into an "inactive" state.

Steering system 1 may also include a manual "over-ride" that prevents torsion bar 66 from being over twisted. The relative, rotational movement of torsion bar 66 may be structurally limited to a maximum of six degrees, for example. This situation may correspond, for example, to a steering wheel torque of approximately 10.8 Newton-meters. For higher steering wheel torque, there is no additional steering assist for the operator. This torque bypass feature assures that there is at least manual steering capability, should control valve arrangement 3 fail. The feature also prevents torsion bar 66 from yielding due to over-twisting, allows for manual steering torque with power steering assist during severe, high speed maneuvers and parking maneuvers.

FIG. 8 is a cross sectional view of a second aspect of steering mechanism 2, shown with hydraulic cylinder 4. The second aspect, commonly referred to as a "recirculating ball" mechanism, comprises a steering shaft 88 attached to a torsion bar 92 of reduced cross sectional area, which attaches by a pin 104 to a worm gear 102. Worm gear 102 operationally engages an integral gear 100 with a plurality of recirculating balls 106. Integral gear 100 has a plurality of teeth 108 that engage with a plurality of teeth 110 on an arm gear 112. A housing 98 holds integral gear 100 and arm gear 112 in a mating arrangement. Rotation of steering shaft 88, therefore, causes angular movement of an arm 114 (also "Pittman arm") in one of two directions corresponding to the turning direction. Arm 114 pivotally attaches to a rod 116 of a conventional, motor vehicle steering apparatus. The distal end of integral gear 100 attaches to a piston 96 disposed inside of hydraulic cylinder 4. Housing 98 and piston 96 define first chamber 6 and second chamber 8, each having a variable volume.

Second aspect of steering mechanism 2 shown in FIG. 8 also incorporates steering sensor 10, comprising first electrical conductor 118, second electrical conductor 119, and third electrical conductor 120, and at least one electrical switch element 90. Steering sensor 10 of the second aspect may be functionally and structurally the same as described for the first aspect of steering mechanism 2, shown in FIG. 7.

While the present invention has been illustrated by a description of several expressions, embodiments, methods, and examples, etc. thereof, it is not the intention of the applicants to restrict or limit the spirit and scope of the appended claims to such detail. Numerous other variations, combinations, changes, and substitutions will occur to those skilled in the art without departing from the scope of the invention. It will be understood that the foregoing description is provided by way of example, and that other modifications may occur to those skilled in the art without departing from the scope and spirit of the appended claims.

What is claimed is:

1. A hydraulic power steering system for a motorized vehicle comprising:
    a hydraulic pump for generating hydraulic pressure;
    a hydraulic cylinder system having a first chamber of variable volume, a second chamber of variable volume, and at least one movable piston;
    a steering mechanism operatively engaged with the at least one piston of the hydraulic cylinder;
    a hydraulic fluid reservoir; and
    a control valve arrangement operable to selectively connect the first and second chambers of the hydraulic cylinder to the pump and the reservoir, the control valve arrangement operable in at least a first condition, a second condition, and a third condition; wherein
        in the first condition the control valve arrangement connects the first chamber with the pump and connects the second chamber with the reservoir for fluid communication therebetween;
        in the second condition the control valve arrangement connects the first chamber with the reservoir and connects the second chamber with the pump for fluid communication therebetween; and
        in the third condition the control valve arrangement connects the first and second chambers with each other and disconnects the first and second chambers from the reservoir.

2. The hydraulic power steering system of claim 1, wherein the first condition corresponds to a steering assist operation in a first direction, the second condition corresponds to a steering assist operation in a second direction, and the third condition corresponds to a no steering assist operation.

3. The hydraulic power steering system of claim 1, wherein the control valve arrangement comprises a solenoid activated, three position valve.

4. The hydraulic power steering system of claim 3, wherein the control valve arrangement further comprises a solenoid activated, two position valve in series with the solenoid activated, three position valve.

5. The hydraulic power steering system of claim 1, further comprising:
   a steering sensor operatively engaged with the steering mechanism; and
   a control box operable to switch the control valve arrangement between the first, second and third conditions in response, at least in part, to a signal received from the steering sensor.

6. The hydraulic power steering system of claim 5, wherein the steering sensor comprises a torsion bar within a housing and a plurality of electrical contacts spaced circumferentially about the torsion bar so that as the torsion bar winds up relative to said housing, a series of electrical connections are made sequentially.

7. The hydraulic power steering system of claim 5, further comprising an electromagnetic clutch operable to engage the hydraulic pump with a driving motor when the clutch is actuated, wherein the control box is operable to actuate the electromagnetic clutch in response, at least in part, to a signal received from the steering sensor.

8. The hydraulic power steering system of claim 7, further comprising a pressure transducer in fluid communication with the first chamber, wherein the control box is operable to actuate the electromagnetic clutch in response, at least in part, to a signal received from the pressure transducer.

9. The hydraulic power steering system of claim 1, wherein the steering mechanism is a rack and pinion steering mechanism.

10. The hydraulic power steering system of claim 1, wherein the steering mechanism is a recirculating ball steering mechanism.

11. A hydraulic power steering system for a motorized vehicle comprising:
   a hydraulic pump for generating hydraulic pressure;
   a hydraulic cylinder system having a first chamber of variable volume, a second chamber of variable volume, and at least one movable piston;
   a steering mechanism operatively engaged with the at least one piston of the hydraulic cylinder;
   a hydraulic fluid reservoir;
   a pressure accumulator selectively connected to the hydraulic pump and chargeable to a desired pressure; and
   a control valve arrangement operable to selectively connect the first and second chambers of the hydraulic cylinder to the pump, the pressure accumulator and the reservoir, the control valve arrangement operable in at least a first condition, a second condition, and a third condition; wherein:
      in the first condition the control valve arrangement connects the first chamber with the pump and connects the second chamber with the reservoir for fluid communication therebetween;
      in the second condition the control valve arrangement connects the first chamber with the reservoir and connects the second chamber with the pump for fluid communication therebetween; and
      in the third condition the control valve arrangement connects the first and second chambers with the pressure accumulator and disconnects the first and second chambers from the fluid reservoir.

12. The hydraulic power steering system of claim 11, wherein the desired pressure in the pressure accumulator is in the range of approximately 100 to 1800 psi.

13. The hydraulic power steering system of claim 12, wherein the desired pressure in the pressure accumulator is in the range of approximately 100 to 300 psi.

14. The hydraulic power steering system of claim 11, wherein in the third condition the control valve arrangement further connects the first and second chambers with each other for fluid communication therebetween.

15. A hydraulic power steering system for a motorized vehicle comprising:
   a hydraulic pump for generating hydraulic pressure;
   a hydraulic cylinder system having a first chamber of variable volume, a second chamber of variable volume, and at least one movable piston;
   a steering mechanism operatively engaged with the at least one piston of the hydraulic cylinder;
   a hydraulic fluid reservoir;
   a pressure accumulator selectively connected to the hydraulic pump and chargeable to a desired pressure; and
   a control valve arrangement operable to selectively connect the first and second chambers of the hydraulic cylinder to the pump, the pressure accumulator and the reservoir, the control valve arrangement operable in a least three conditions, wherein:
      in the first condition the control valve arrangement connects the first chamber with the pressure accumulator and connects the second chamber with the reservoir for fluid communication therebetween;
      in the second condition the control valve arrangement connects the first chamber with the reservoir and connects the second chamber with the pressure accumulator for fluid communication therebetween; and
      in the third condition the control valve arrangement connects the first and second chambers with each other and disconnects the first and second chambers from the reservoir.

16. The hydraulic power steering system of claim 15, wherein the control valve arrangement is further operable in a fourth condition and a fifth condition, wherein in the fourth condition the control valve arrangement connects the first chamber with the pump and connects the second chamber with the reservoir for fluid communication therebetween, and wherein in the fifth condition the control valve arrangement connects the first chamber with the reservoir and the second chamber with the pump for fluid communication therebetween.

17. The hydraulic power steering system of claim 15, wherein the desired pressure in the pressure accumulator is in the range of approximately 400 to 600 psi.

18. A hydraulic power steering system for a motorized vehicle comprising:
   a hydraulic pump for generating hydraulic pressure;
   a hydraulic cylinder system having a first chamber of variable volume, a second chamber of variable volume, and at least one movable piston;
   a steering mechanism operatively engaged with the at least one piston of the hydraulic cylinder;
   a hydraulic fluid reservoir;
   a first pressure accumulator selectively connected to the hydraulic pump and chargeable to a first pressure;
   a second pressure accumulator selectively connected to the hydraulic pump and chargeable to a second pressure; and a control valve arrangement operable to selectively connect the first and second chambers of the hydraulic cylinder to the pump, the first pressure accumulator, the second pressure accumulator and the reservoir, the control valve arrangement operable in at least four conditions; wherein:
in a first condition the control valve arrangement connects the first chamber with the first pressure accumulator and connects the second chamber with the reservoir for fluid communication therebetween;
in a second condition the control valve arrangement connects the first chamber with the reservoir and connects the second chamber with the first pressure accumulator for fluid communication therebetween;
in a third condition the control valve arrangement connects the first chamber with the second pressure accumulator and connects the second chamber with the reservoir for fluid communication therebetween; and
in a fourth condition the control valve arrangement connects the first chamber with the reservoir and connects the second chamber with the second pressure accumulator for fluid communication therebetween.

19. The hydraulic power steering system of claim 18, wherein the second pressure is greater than the first pressure.

20. The hydraulic power steering system of claim 19, wherein the first condition corresponds to a low pressure steering assist operation in a first direction, the second condition corresponds to a low pressure steering assist operation in second direction, the third condition corresponds to a high pressure steering assist operation in the first direction and the fourth condition corresponds to a high pressure steering assist operation in the second direction.

21. The hydraulic power steering system of claim 18, wherein in the first condition the control valve arrangement also disconnects the first chamber from the pump and the second pressure accumulator.

22. The hydraulic power steering system of claim 18, further comprising a third pressure accumulator selectively connected to the hydraulic pump and chargeable to a third pressure, wherein the control valve arrangement is further operable to selectively connect the first and second chambers to the third pressure accumulator for fluid communication therebetween.

23. The hydraulic power steering system of claim 22, wherein the third pressure is greater than the second pressure.

24. The hydraulic power steering system of claim 19 wherein the first pressure is in the range of approximately 400 to 600 psi and the second pressure is in the range of approximately 600 to 1800 psi.

25. A hydraulic power steering system for a motorized vehicle comprising:
a hydraulic pump for generating hydraulic pressure;
a hydraulic cylinder system having a first chamber of variable volume, a second chamber of variable volume, and at least one movable piston;
a steering mechanism operatively engaged with the at least one piston of the hydraulic cylinder;
a hydraulic fluid reservoir;
a first pressure accumulator selectively connected to the hydraulic pump and chargeable to a first pressure;
a second pressure accumulator selectively connected to the hydraulic pump and chargeable to a second pressure; and
a control valve arrangement operable to selectively connect the first and second chambers of the hydraulic cylinder to the pump, the first pressure accumulator, the second pressure accumulator and the reservoir, the control valve arrangement operable in at least three conditions; wherein:
in a first condition the control valve arrangement connects the first chamber with the second pressure accumulator and connects the second chamber with the reservoir for fluid communication therebetween;
in a second condition the control valve arrangement connects the first chamber with the reservoir and connects the second chamber with the second pressure accumulator for fluid communication therebetween; and
in a third condition the control valve arrangement connects the first and second chambers with the first pressure accumulator and disconnects the first and second chambers from the reservoir.

26. The hydraulic power steering system of claim 25, wherein the first pressure is in the range of approximately 100 to 300 psi and the second pressure is in the range of approximately 400 to 1800 psi.

27. A hydraulic power steering system for a motorized vehicle comprising:
a pump for generating hydraulic pressure;
a hydraulic cylinder system having a first chamber of variable volume and a second chamber of variable volume;
a steering mechanism operatively engaged to the hydraulic cylinder;
a hydraulic fluid reservoir;
a pressure accumulator selectively connected to the hydraulic pump and chargeable to a desired pressure; and
a control valve arrangement operable to selectively connect the first and second chambers of the hydraulic cylinder to the pressure accumulator and the reservoir;
wherein, when no steering assist is required, the control valve arrangement connects the first and second chambers with the pressure accumulator and disconnects the first and second chambers from the fluid reservoir.

28. A hydraulic power steering system for a motorized vehicle comprising:
a hydraulic pump for generating hydraulic pressure;
a hydraulic cylinder system having a first chamber of variable volume, a second chamber of variable volume, and at least one movable piston;
a steering mechanism operatively engaged with the at least one piston of the hydraulic cylinder;
a hydraulic fluid reservoir;
a first pressure accumulator selectively connected to the hydraulic pump and chargeable to a first pressure;
a second pressure accumulator selectively connected to the hydraulic pump and chargeable to a second pressure;
a third pressure accumulator selectively connected to the hydraulic pump and chargeable to a third pressure;
a steering sensor operatively engaged with the steering mechanism;
a control valve arrangement operable to selectively connect the first and second chambers of the hydraulic cylinder to the pump, the first pressure accumulator, the second pressure accumulator, the third pressure accumulator and the reservoir, the control valve arrangement operable in at least seven conditions, wherein:
the first condition is characterized by the first chamber being in fluid communication with the pump and the second chamber being in fluid communication with the fluid reservoir;

the second condition characterized is by the first chamber being in fluid communication with the fluid reservoir and the second chamber being in fluid communication with the pump;

the third condition is characterized by the first chamber being in fluid communication with the second pressure accumulator, and the second chamber being in fluid communication with the fluid reservoir; and the fourth condition is characterized by the first chamber being in fluid communication with the fluid reservoir, and the second chamber is in fluid communication with the second pressure accumulator.

the fifth condition is characterized by the first chamber being in fluid communication with the third pressure accumulator, and the second chamber being in fluid communication with the fluid reservoir;

the sixth condition is characterized by the first chamber being in fluid communication with the fluid reservoir, and the second chamber being in fluid communication with the third pressure accumulator; and the seventh condition is characterized by the first and second chambers being in fluid communication the first pressure accumulator and each other but not with the fluid reservoir;

a control box operable to switch the control valve arrangement between said operating conditions in response, at least in part, to signals received from the steering sensor.

29. The hydraulic power steering system of claim 28, wherein the first pressure is in the range of approximately 100 to 300 psi, the second pressure is in the range of approximately 400 to 600 psi and the third pressure is in the range of approximately 600 to 1800 psi.

30. The hydraulic power steering system of claim 28, further comprising:

an electromagnetic clutch operable to engage the hydraulic pump with a driving motor when the clutch is actuated, wherein the control box is operable to actuate the electromagnetic clutch in response, at least in part, to a signal received from the steering sensor.

* * * * *